US010579850B2

(12) United States Patent
Suwald

(10) Patent No.: US 10,579,850 B2
(45) Date of Patent: Mar. 3, 2020

(54) FINGERPRINT SENSING SYSTEM AND METHOD

(71) Applicant: NXP B.V., Eindhoven (NL)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 155 days.

(21) Appl. No.: 15/820,405

(22) Filed: Nov. 21, 2017

(65) Prior Publication Data

US 2018/0144170 A1    May 24, 2018

(30) Foreign Application Priority Data

Nov. 24, 2016 (EP) ..................................... 16200439

(51) Int. Cl.
*G06K 9/00* (2006.01)
(52) U.S. Cl.
CPC .................................. *G06K 9/0002* (2013.01)
(58) Field of Classification Search
CPC .................................................... G06K 9/0002
See application file for complete search history.

(56) References Cited

U.S. PATENT DOCUMENTS

| | | | | |
|---|---|---|---|---|
| 4,636,714 A * | 1/1987 | Allen | ................... | G01D 5/2417 324/662 |
| 5,434,446 A * | 7/1995 | Hilton | ................. | H01L 27/1203 257/503 |
| 5,812,019 A * | 9/1998 | Ngo | ........................ | G01R 33/09 327/538 |
| 5,940,526 A * | 8/1999 | Setlak | ................... | G06K 9/0002 382/124 |
| 6,049,620 A * | 4/2000 | Dickinson | .............. | G01B 7/004 382/108 |
| 6,778,686 B1 * | 8/2004 | Hestnes | ................. | G01B 7/004 382/124 |
| 9,710,690 B1 * | 7/2017 | Carling | .............. | G06K 9/00087 |
| 2003/0190061 A1 * | 10/2003 | Chou | ................... | G06K 9/0002 382/124 |

(Continued)

FOREIGN PATENT DOCUMENTS

WO    98/52147       11/1998
WO    99/41696 A1    8/1999

OTHER PUBLICATIONS

Extended European Search Report for Patent Appln. No. 16200439.4 dated Sep. 21, 2017.

*Primary Examiner* — Aaron W Carter

(57) ABSTRACT

According to a first aspect of the present disclosure, a fingerprint sensing system is provided, the system comprising: a plurality of sensors and a controller, wherein the controller is configured to selectively activate at least one of the plurality of sensors; wherein the controller is further configured to develop and measure at least one first capacitance, the first capacitance developing in response to a capacitance between a surface of an active sensor and a surface of a finger; and wherein the controller is further configured to develop at least one second capacitance, the second capacitance developing in response to a capacitance between a surface of an inactive sensor and the surface of the finger. According to a second aspect of the present disclosure, a corresponding fingerprint sensing method is conceived.

11 Claims, 10 Drawing Sheets

(56) References Cited

U.S. PATENT DOCUMENTS

| | | | |
|---|---|---|---|
| 2003/0202300 A1* | 10/2003 | Tyler | H01L 27/0255 |
| | | | 361/56 |
| 2005/0139685 A1 | 6/2005 | Kozlay | |
| 2006/0222218 A1* | 10/2006 | Karaki | G06K 9/0002 |
| | | | 382/124 |
| 2008/0309800 A1 | 12/2008 | Olsen et al. | |
| 2010/0071459 A1* | 3/2010 | Kamm | G01D 3/036 |
| | | | 73/304 C |
| 2011/0211611 A1* | 9/2011 | Troccoli | G06K 9/0002 |
| | | | 374/45 |
| 2011/0303823 A1* | 12/2011 | Mori | A61B 6/4233 |
| | | | 250/208.1 |
| 2013/0181949 A1 | 7/2013 | Setlak | |
| 2015/0062709 A1* | 3/2015 | Matsuyuki | C03C 17/3417 |
| | | | 359/584 |
| 2015/0070079 A1* | 3/2015 | Yang | G06K 9/0002 |
| | | | 327/517 |
| 2016/0239700 A1 | 8/2016 | Yang et al. | |
| 2016/0350577 A1* | 12/2016 | Yang | G06K 9/00053 |
| 2016/0371527 A1 | 12/2016 | Suwald | |
| 2017/0116505 A1 | 4/2017 | Suwald | |
| 2018/0144170 A1* | 5/2018 | Suwald | G06K 9/0002 |

* cited by examiner

FINGERPRINT SENSING SYSTEM AND METHOD

CROSS-REFERENCE TO RELATED APPLICATIONS

This application claims the priority under 35 U.S.C. § 119 of European patent application no. 16200439.4, filed on Nov. 24, 2016, the contents of which are incorporated by reference herein.

FIELD

The present disclosure relates to a fingerprint sensing system. Furthermore, the present disclosure relates to a corresponding fingerprint sensing method.

BACKGROUND

Today, many electronic devices and systems require a form of user authentication. For example, in a payment system, a smart card may be used to initiate a payment and to authenticate a user. In addition to conventional user authentication via a personal identification number (PIN), a smart card may also include a fingerprint sensor for capturing the user's fingerprint. In that case, the captured fingerprint may be used to ascertain that the smart card is presented to a terminal by its rightful owner, for example.

SUMMARY

According to a first aspect of the present disclosure, a fingerprint sensing system is provided, the system comprising: a plurality of sensors and a controller, wherein the controller is configured to selectively activate at least one of the plurality of sensors; wherein the controller is further configured to develop and measure at least one first capacitance, the first capacitance developing in response to a capacitance between a surface of an active sensor and a surface of a finger; and wherein the controller is further configured to develop at least one second capacitance, the second capacitance developing in response to a capacitance between a surface of an inactive sensor and the surface of the finger.

In one or more embodiments, the controller is a readout amplifier.

In one or more embodiments, the sensors correspond to pixels of a fingerprint image.

In one or more embodiments, the sensors are formed in a first conductive layer of an integrated circuit.

In one or more embodiments, the integrated circuit further comprises a second conductive layer proximate to the first conductive layer, the second conductive layer being arranged to reduce a parasitic capacitance that develops between the sensors and a substrate of the integrated circuit.

In one or more embodiments, at least one sensor is surrounded by a conductive ring electrically coupled to the second conductive layer.

In one or more embodiments, the second conductive layer is coupled to the first conductive layer via a voltage follower.

In one or more embodiments, the second conductive layer is selectively connectable to ground potential or to a reference potential via one or more switches.

In one or more embodiments, the reference potential is provided by a voltage follower operatively coupled to a storage capacitor.

In one or more embodiments, the storage capacitor is configured as an N-diffusion on P-substrate gate-oxide capacitor or an N-diffusion on N-well gate-oxide capacitor.

In one or more embodiments, the system further comprises a shift register arrangement configured to control a plurality of switches for facilitating selectively activating said at least one of the plurality of sensors.

In one or more embodiments, the controller is further configured to periodically evaluate a predefined subset of the plurality of sensors.

In one or more embodiments, the number of inactive sensors is at least a thousand or several thousands times larger than the number of active sensors.

In one or more embodiments, a smart card comprises a fingerprint sensing system of the kind set forth.

According to a second aspect of the present disclosure: a fingerprint sensing method is conceived, the method comprising: selectively activating, by a controller in a fingerprint sensing system, at least one of a plurality of sensors of said fingerprint sensing system; developing and measuring, by said controller, at least one first capacitance, the first capacitance developing in response to a capacitance between a surface of an active sensor and a surface of a finger; developing, by said controller, at least one second capacitance, the second capacitance developing in response to a capacitance between a surface of an inactive sensor and the surface of the finger.

DESCRIPTION OF DRAWINGS

Embodiments will be described in more detail with reference to the appended drawings, in which.

DESCRIPTION OF EMBODIMENTS

Figure 1:
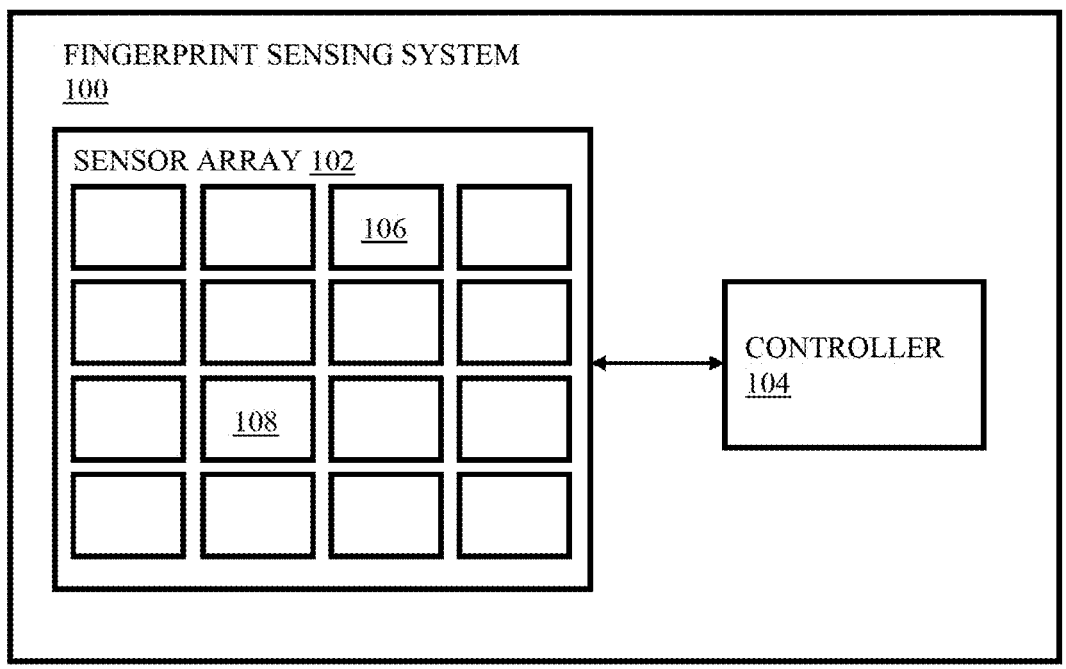
FIG. 1 shows an illustrative embodiment of a fingerprint sensing system.

There is an increasing demand for biometric payment verification. However, the budget available for biometric verification tokens, such as smart cards, and their infrastructure may be limited. The integration cost of smart cards is among others determined by the need for a metal frame (e.g., a bezel) surrounding the active sensor area providing galvanic contact to the finger's surface, the high resolution of actual fingerprint sensors requiring a high sampling rate and the complexity of the sensor amplification circuitry requiring expensive process options for monolithic integration. The infrastructure cost is among others dependent on the requirement to make a smart card with fingerprint verification from the smart card reader perspective compatible with existing smart cards with PIN-code verification.

The number of sensing elements (sensors, in short) that form a fingerprint sensing system determines the power consumption of the fingerprint image capturing device. For a given image sampling time a larger number of image samples requires a shorter image sample time which requires a larger slew-rate of the sensing elements. The integral power consumption is the number of image samples multiplied by the average power consumption for capturing one image sample. The relationship between the number of image samples and the power consumption is a quadratic function for a constant image capture time. Reducing e.g. the number of samples by a factor of two may reduce the power consumption by approximately a factor of 4. It is important to minimize the average power consumption required to capture one image sample. Implementations of fingerprint sensing systems often have an active amplifier embedded into every pixel sensing cell (i.e., sensing element or sensor). The quiescent current of all these amplifiers sums up to an unacceptable high supply current. It is thus important to minimize the power consumption for taking one image sample. In case of a reduced number of sensing elements a good signal-to-noise ratio of the image generated by the sensing system is an important requirement. In current implementations of sensing elements a large parasitic capacitance to substrate is often involved in the sensor capacitance. The parasitic capacitance to substrate is not affected by the finger and hence reduces the sensitivity of the sensing capacitor by up to 50%. It is important to maximize the sensor capacitance while reducing the impact of parasitic capacitances.

Reducing the total number of pixel sensors that form the fingerprint sensing system will increase the area being available for one sensor, which may help to reduce the impact of non-linear capacitances. In most fingerprint sensing systems a metal frame surrounding the active sensor surface (i.e., a bezel) provides galvanic access to the finger's surface in order to utilize it as a counter electrode to a sensing electrode. In this configuration the finger's surface and the sensing electrode form a direct field sensing capacitor. Direct field capacitance provides more options to increase the thickness of protecting and insulating layers between the sensing plate and the finger's surface compared to sensing capacitors that use fringe field sensing capacitors. As a drawback such metal frame increases card integration cost significantly; furthermore its rigid construction reduces the smart card's mechanical endurance under application of mechanical stress. Another drawback of the metal frame is its impact on the sensing device's electrostatic discharge (ESD) performance. Thus, it may be important that no galvanic interface is exhibited to the finger. The number of sensing elements may be high, which results in a complex sensing system layout. Fingerprint sensing systems often utilize fully decoded row and column addressing signals for addressing individual sensing elements. This approach of addressing individual sensing elements imposes high requirements on routing and also on processing options. Production cost is mainly impacted by the amount of process options that are required for monolithic integration. Especially the amount of metal layers has a direct impact on manufacturing cost. It is important to minimize the amount of utilized metal layers. Moreover, column addressing utilizing binary counters in combination with column decoders may result in fixed pattern noise due to irregular switching states of binary counters.

According to a first aspect of the present disclosure, a fingerprint sensing system is provided, the system comprising: a plurality of sensors and a controller, wherein the controller is configured to selectively activate at least one of the plurality of sensors; wherein the controller is further configured to develop and measure at least one first capacitance, the first capacitance developing in response to a capacitance between a surface of an active sensor and a surface of a finger; and wherein the controller is further configured to develop at least one second capacitance, the second capacitance developing in response to a capacitance between a surface of an inactive sensor and the surface of the finger. Thus, more specifically, the controller may activate one or more sensors, for example by applying a reference voltage to said sensors, which causes that the first capacitance develops in response to a capacitance between the surface of these sensors and the surface of the finger. This first capacitance may be measured by the controller and used for determining the valley depth at the location of the particular sensor. Since the first capacitance is measured with the purpose of fingerprint sensing, it may be referred to as a sensing capacitance. In addition, the controller may develop at least one second capacitance, which develops in response to a capacitance between a surface of an inactive sensor and the surface of the finger, for example by connecting the surface of the inactive sensor to a ground potential. The second capacitance is not measured, but it provides or increases the capacitive coupling between the sensing system and the finger. Therefore, the second capacitance may be referred to as a coupling capacitance. The capacitive coupling realized by means of the second capacitance effectively replaces the aforementioned galvanic interface to the finger, which is often realized by means of a metal frame (e.g. a bezel). As a consequence, the metal frame may be omitted. Thus, in other words, each sensor may be configured to provide, in an inactive state, a coupling capacitance that develops between a surface of the sensor and a surface of the finger, wherein the surface of the sensor may for example be connected to system ground potential. Because the number of inactive sensors may be large compared to the number of activated sensors, said coupling capacitance can be large compared to the capacitance of activated sensors. Therefore, a good capacitive coupling of the finger's surface to system ground potential may be realized. For instance, the number of inactive sensors may be at least a thousand or several thousands times larger than the number of active sensors. In this way, the effect of coupling capacitance variations on the sensing capacitance measurements is small. Consequently, the accuracy of the measurement results may be increased. Furthermore, the fingerprint sensing system comprises a controller configured to selectively activate at least one of the plurality of sensors. Thereby, the system can activate specific sensors in a flexible manner, while leaving other sensors inactive. This may reduce the power consumption of the system, for example.

FIG. 1 shows an illustrative embodiment of a fingerprint sensing system 100. The system 100 comprises a sensor array 102 which in turn comprises a plurality of sensors arranged in rows and columns. Furthermore, the system 100 comprises a controller 104 configured to selectively activate at least one of the plurality of sensors. In this example, the controller 104 has activated two sensors 106, 108 for capacitive measurements. It is noted that the term "active sensor" refers to a sensor whose capacitance is or will be measured by the controller 104 with the purpose of generating a fingerprint image. The other sensors are inactive, meaning that they have not been activated for capacitive measurements by the controller 104. In a practical and efficient implementation, the controller 104 is a readout amplifier.

In particular, the capacitance between a sensor plate (i.e., a metal plate comprised in a sensor) and the finger may be measured in order to determine the gap between the finger's surface and the sensing plate. The measurement principle may require that the finger's surface is connected to a common ground node. In accordance with the present disclosure, capacitive coupling to the finger's surface may be utilized instead of a galvanic coupling by a metal frame. Furthermore, those metal plates that are not used for capacitance sensing may be used for capacitive coupling. These inactive sensors may be spread over the whole surface of the sensing system and may enable good coupling. Compared to galvanic coupling by a metal frame the metal plates (i.e., electrodes) provide coupling where it is required. Thus, only a small subset of the sensors may be activated, which further reduces the power consumption. For example, in a sensor matrix, only one or a couple of sensors may be activated for capacitive sensing while all other sensors remain inactive for capacitive sensing; yet, the inactive sensors may provide adequate capacitive coupling to the finger's surface. Due to good capacitive coupling the finger's surface may be utilized to form a direct field capacitor with the plates of the active sensors. The capacitance between the finger's surface and the plates of the active sensors is indicative of the fingerprints topology. A fingerprint image may be created from the capacitance measurement taken from a plurality of active sensors. In a practical and efficient implementation, the sensors correspond to pixels of a fingerprint image.

The fingerprint image may be generated by sequentially sensing the capacitance between the finger's surface and the sensor plates. In every measurement cycle a subset of sensor plates (i.e., the plates of the activated sensors) may be used to create a first electrode of a sensing capacitor while the finger forms the second electrode. All other sensor plates may be not have been activated for capacitive measurements (i.e., they may be inactive for capacitive sensing) but they may be utilized to form a first electrode of a coupling capacitor while the finger forms the second electrode of said coupling capacitor. The number of sensors involved in forming the coupling capacitor may be more than 1000 times the number of capacitors involved in forming the sensing capacitor. In the example shown in FIG. 1 only two sensors 106, 108 are involved in capacitive sensing, while the other sensors may be used to form a coupling capacitor with the finger.

Figure 2:
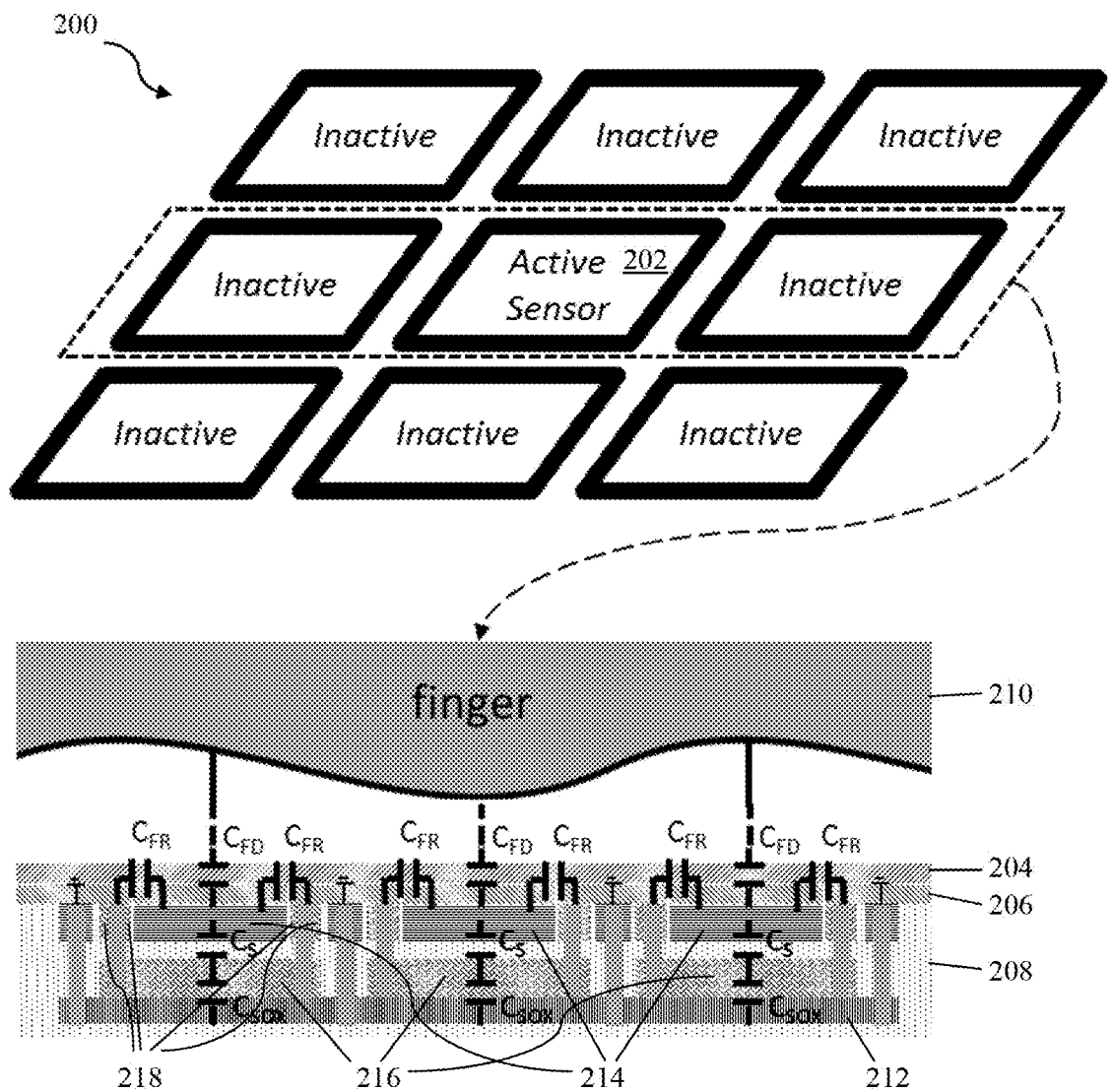
FIG. 2 shows another illustrative embodiment of a fingerprint sensing system.

FIG. 2 shows another illustrative embodiment of a fingerprint sensing system 200. In this example, the fingerprint sensing system 200 comprises an array of nine sensors arranged in three rows and three columns. The controller (not shown) has activated one sensor 202 for capacitive measurements, the other sensors have not been activated. In the lower part of FIG. 2 a cross-section is shown of the second row of sensors. Since only the middle sensor 202 of the second row is active, only the capacitance that develops between this sensor 202 and the surface of the finger 210 will be measured. The sensors are embedded in an integrated circuit, which comprises a substrate 208, a passivation layer 206 and a coating 204. In this practical and efficient implementation, the sensors are formed in a first conductive layer 214 of the integrated circuit. In this way, the sensor plates may be produced easily. Furthermore, the integrated circuit comprises a second conductive layer 216 proximate to the first conductive layer 214. The second conductive layer 216 is arranged to reduce a parasitic capacitance that develops between the sensors and the substrate 208. Thus, the second conductive layer 216 effectively acts a layer of shields. In this example, the second conductive layer 216 is positioned beneath the first conductive layer 214 on an N-diffusion layer 212. Furthermore, the sensors are surrounded by a conductive ring 218 electrically coupled to the second conductive layer 216. Note that, for the sake of clarity, reference numeral 218 only points to the conductive ring 218 that surrounds the left sensor; however, the other sensors are also surrounded by such a ring. The conductive ring 218 may reduce the fringe field capacitance and thereby enable a better measurement result.

Thus, the sensor plates are formed in the first conductive layer 214 of the integrated circuit. In order to prepare the sensors 214 for cancellation of the impact of the parasitic capacitance that develops between them and the substrate 208, shield plates 216 are positioned under the sensor plates. In particular, the shield plates 216 are formed in the second conductive layer 216 of the integrated circuit. The sensor plates may additionally be surrounded by a conductive ring 218, which may be formed in the first conductive layer 214 as well and which is electrically connected to the shield plates 216. The purpose of this ring 218 is the reduction of the fringe field capacitance $C_{FR}$. Above the sensor plates and the conductive ring 218 a passivation layer 206 may be deposited and on top of the passivation layer 206 a coating 204 may be deposited. The passivation layer 206 is a standard process layer while the coating 204 may provide protection of the sensors against mechanical stress.

Each sensor plate may exhibit a first capacitance between its surface and the finger, referred to as sensing capacitance $C_{FD}$. Furthermore, each sensor plate may exhibit a second capacitance between its surface and the conductive ring 218, referred to as sensing capacitance $C_{FR}$. Furthermore, the sensor plate may exhibit a bottom plate capacitance $C_s$, which is series connected to a parasitic capacitance. The first sensing capacitance $C_{FD}$ is inversely related to the valley depth of a fingerprint: the shallower the valley, the higher the capacitance $C_{FD}$. The second sensing capacitance $C_{FR}$ represents the fringe field capacitance between the sensor plate and the conductive ring 218 surrounding the sensor plate. This capacitance may exhibit a non-linear relationship between the depth of the fingerprint valley and the measured capacitance as the fringe field dramatically decreases with the distance to a field influencing conductive layer. The bottom plate capacitance $C_s$ may not be affected by the depth of the fingerprint valley and may thus reduce the sensitivity of the sensor. For optimal sensitivity the impact of this parasitic capacitance should ideally be reduced to zero. Because the size of this parasitic capacitance cannot be reduced it may be assured by design that the voltage drop over this parasitic capacitance may be made zero. In this case no charge may be stored on this capacitor. To cancel the impact of the bottom plate capacitance Cs the shield electrode of this capacitor may be configured to have the same potential as the sensor plate. This may be achieved by connecting the shield plates (i.e., the second conductive layer 216) via a voltage follower (e.g., a unity gain amplifier) to the voltage present on the sensor plates (i.e., the first conductive layer 214). Thus, in one or more embodiments, the second conductive layer 216 is coupled to the first conductive layer 214 via a voltage follower.

In order to further reduce the complexity of the design, a shield plate may be connected to ground potential when the corresponding sensor plate is connected to ground potential and to a reference potential when the corresponding sensor plate is connected to the readout amplifier the reference potential relates to a voltage level $V_{REF}$ in the settled state. Switches may be used instead of a voltage follower to connect the shield plate either to ground potential or to the reference potential $V_{REF}$. Thus, in one or more embodiments, the second conductive layer 214 (shield plates) is selectively connectable to ground potential or to a reference potential via one or more switches.

In some embodiments, the shield potential may be switched between ground potential and the potential provided by a voltage follower having an input connected to $V_{REF}$ and an output connected to a sufficiently large storage capacitor. While switching the shield between ground and $V_{REF}$ switching currents occur that may have to be provided by the amplifier. In case a storage capacitor is connected to the amplifier's output this capacitor may provide a large part of these currents. Thus the gain of the voltage follower and hence its bias currents may be minimized, which limits power requirements for the overall sensing system.

In some embodiments, the storage capacitor is configured as an N-diffusion on P-substrate gate-oxide capacitor. This capacitor may be positioned underneath the sensor plates; the gate may represent the shield and the diffusion area the counter electrode connected to ground. In this configuration a large storage capacitance may be created. This construction may also reduce the influence of substrate swing on the shield voltage. Furthermore, it may be advantageous to use a storage capacitor configured as N-diffusion on N-well gate-oxide capacitor positioned underneath the sensor plate, in which case the gate may represent the shield and the diffusion area the counter electrode connected to ground. The gate-oxide capacitor is here operated in accumulation mode which provides better linearity around low voltage levels of the reference voltage $V_{REF}$. Optionally, the storage capacitor underneath the sensor plate may only cover a part of the sensor plate's area.

Figure 3:
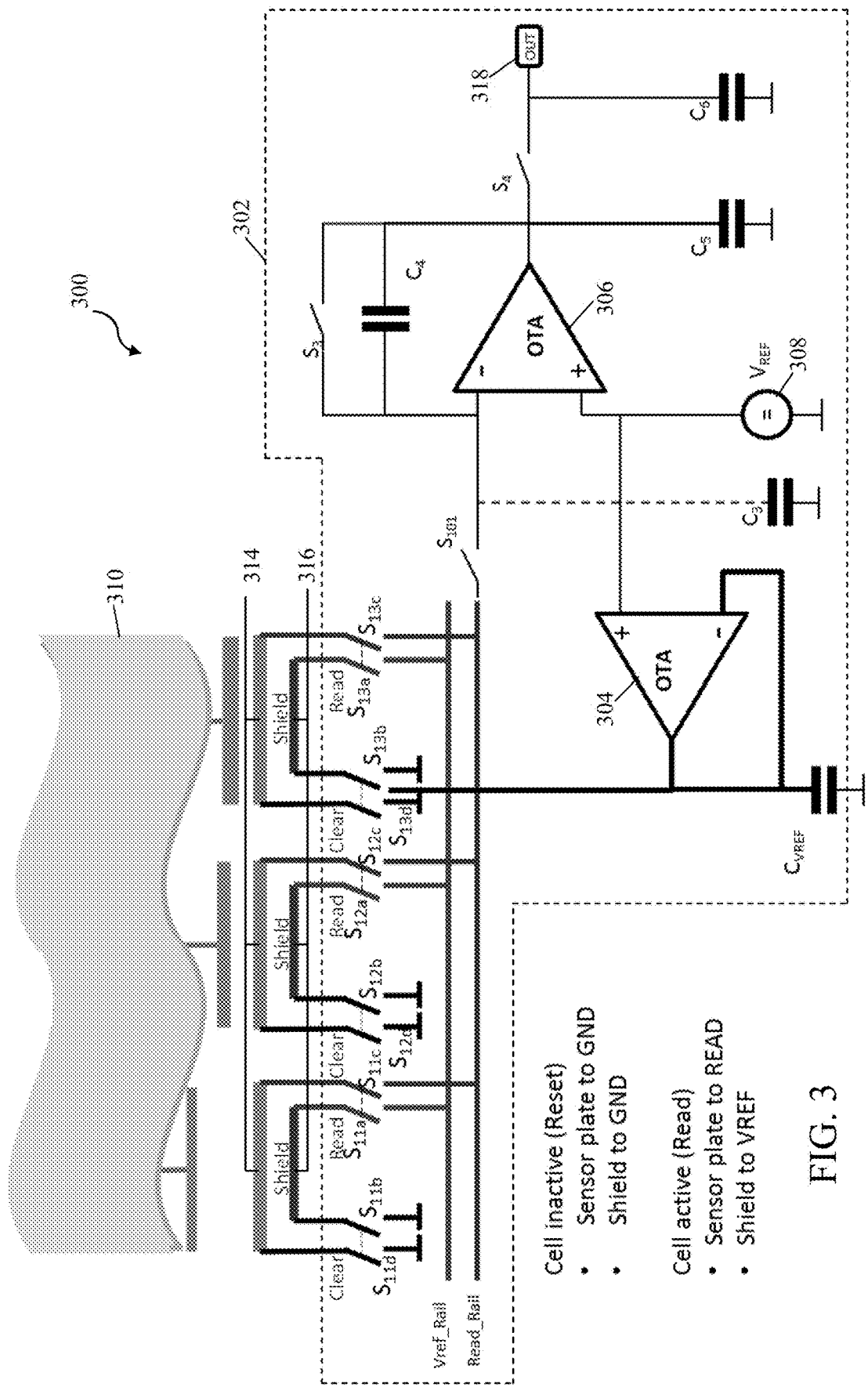
FIG. 3 shows a further illustrative embodiment of a fingerprint sensing system.

FIG. 3 shows a further illustrative embodiment of a fingerprint sensing system 300. The system 300 comprises a controller for selectively activating one or more sensors. The sensors are formed in a first conductive layer 314 of an integrated circuit. In particular, three portions of the first conductive layer 314 form respective sensor plates or electrodes. Shield plates are provided underneath the sensor plates, in a second conductive layer 316 of the integrated circuit. In this embodiment, the controller is a readout amplifier 302 operatively coupled to the sensor plates and shield plates through a plurality of switches $S_{11a}$, $S_{11b}$, $S_{11c}$, $S_{11d}$, $S_{12a}$, $S_{12b}$, $S_{12c}$, $S_{12d}$, $S_{13a}$, $S_{13b}$, $S_{13c}$, $S_{13d}$. Furthermore, the readout amplifier comprises a first 304 and second 308 operational transconductance amplifier (OTA), a reference voltage source 308 and an output 318.

In particular, the fingerprint sensing system 300 may be configured as a matrix of sensing elements or cells (i.e., sensors) organized in rows and columns. The illustration of FIG. 3 represents an example row with only three sensors. In accordance with the present disclosure, only one readout amplifier 302 may be used: this approach may reduce unwanted fixed pattern noise due to differences between multiple readout amplifiers that may occur as a consequence of monolithic processing. Furthermore, the layout of the sensors may be configured such that mask mismatches during monolithic processing are avoided. Moreover, the power consumption may be reduced significantly if only one readout amplifier is present. Furthermore, a power saving mechanism that may be necessary for switching off unused amplifiers is no longer required, thus reducing the design complexity. The readout amplifier 302 may be configured as a charge amplifier that acts as a capacitance-to-voltage converter, wherein the voltage difference between $V_{OUT}$ and $V_{REF}$ is indicative of the sensing capacitance. Capacitor $C_4$ may be used to set the gain of the readout amplifier 302. Capacitor $C_4$ may be configured such that the output voltage may stay under all measurement conditions within the operational signal swing of the OTA 306. Said voltage difference is indicative for the valley depth.

Assuming that the readout amplifier 302 activates the middle sensor for a capacitive measurement (i.e., assuming that the middle sensor is to be evaluated), then the readout of that sensor may require the processing steps shown in Table 1. It is noted that step 1 is required only once per fingerprint image, step 2 is only required once per row, and steps 3 to 9 are required for every pixel to be read.

TABLE 1

| Step | Phase | Operation | Result |
|---|---|---|---|
| 1 | Set Initial Condition | Open all switches | — |
|  |  | Close all Sxxb | Discharge all sensor caps |
|  |  | Close all Sxxd | Discharge all shield caps |
| 2 | Select a single row | Close S101 | Connect the selected row to the readout system |
| 3 | Line Reset | Close S3 | Configures OTA as voltage follower with $V_{OUT} = V_{REF}$, resets all parasitic capacitors connected to the Read_Rail to $V_{REF}$ |
| 4 | Pixel Reset | Close S12c | Stops pixel sensor discharge |
|  |  | Close S12d | Stops pixel shield discharge |
| 5 | Prepare Readout | Open S3 | Configures OTA as charge amplifier |
| 6 | Readout | Close S12b | Connects a single discharged sensor cap to the readout system, the resulting voltage drop causes the OTA to provide charge through $C_4$ until the sensor cap is charged to $V_{REF}$. The voltage across $C_4$ is indicative for the sensor capacitance |
|  |  | Close S12c | Connects shield cap to $V_{REF}$ |
| 7 | Start Sampling | Close S4 | Connects the sample & hold stage |
| 8 | Hold | Open S4 | Disconnects sample & hold, holds output voltage on $C_6$ for A/D conversion |
| 9 | Set inactive | Open S12a | Disconnects sensor plate |
|  |  | Open S12c | Disconnects shield cap |

Figure 4:
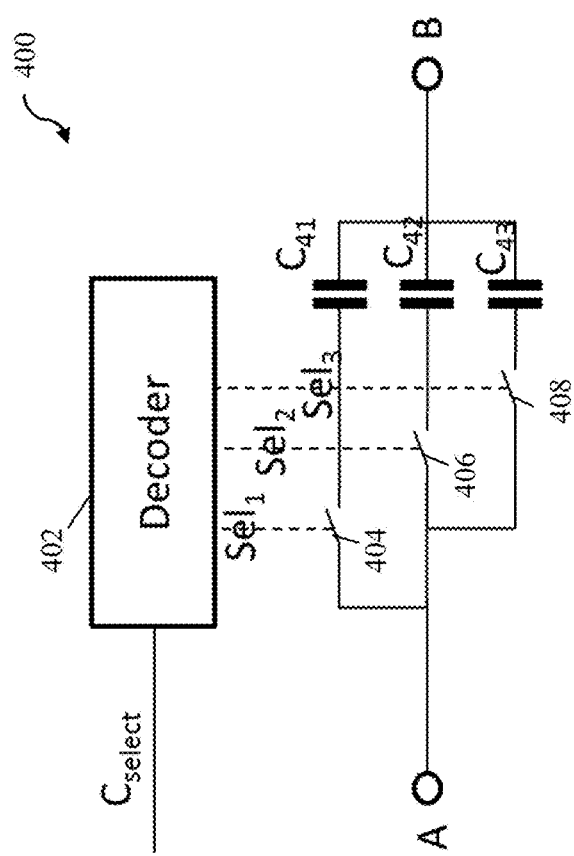
FIG. 4 shows an example of a capacitor controller.

FIG. 4 shows an example of a capacitor controller 400. The capacitor controller 400 comprises a decoder 402 configured to decode a digital control signal $C_{select}$ into selection signals Sel1, Sel2, Sel2, which control a plurality of switches 404, 406, 408. Thus, in some embodiments, the capacitance of capacitor $C_4$ shown in FIG. 3 is made configurable by a suitable digital control signal $C_{select}$. Variation of capacitor C4 may be utilized to adapt the readout amplifier 302 to the skin properties of a finger. The configured capacitance develops between the nodes A and B. If binary weighting is assigned to the capacitors a wide range of capacitance values may be generated.

Figure 5:
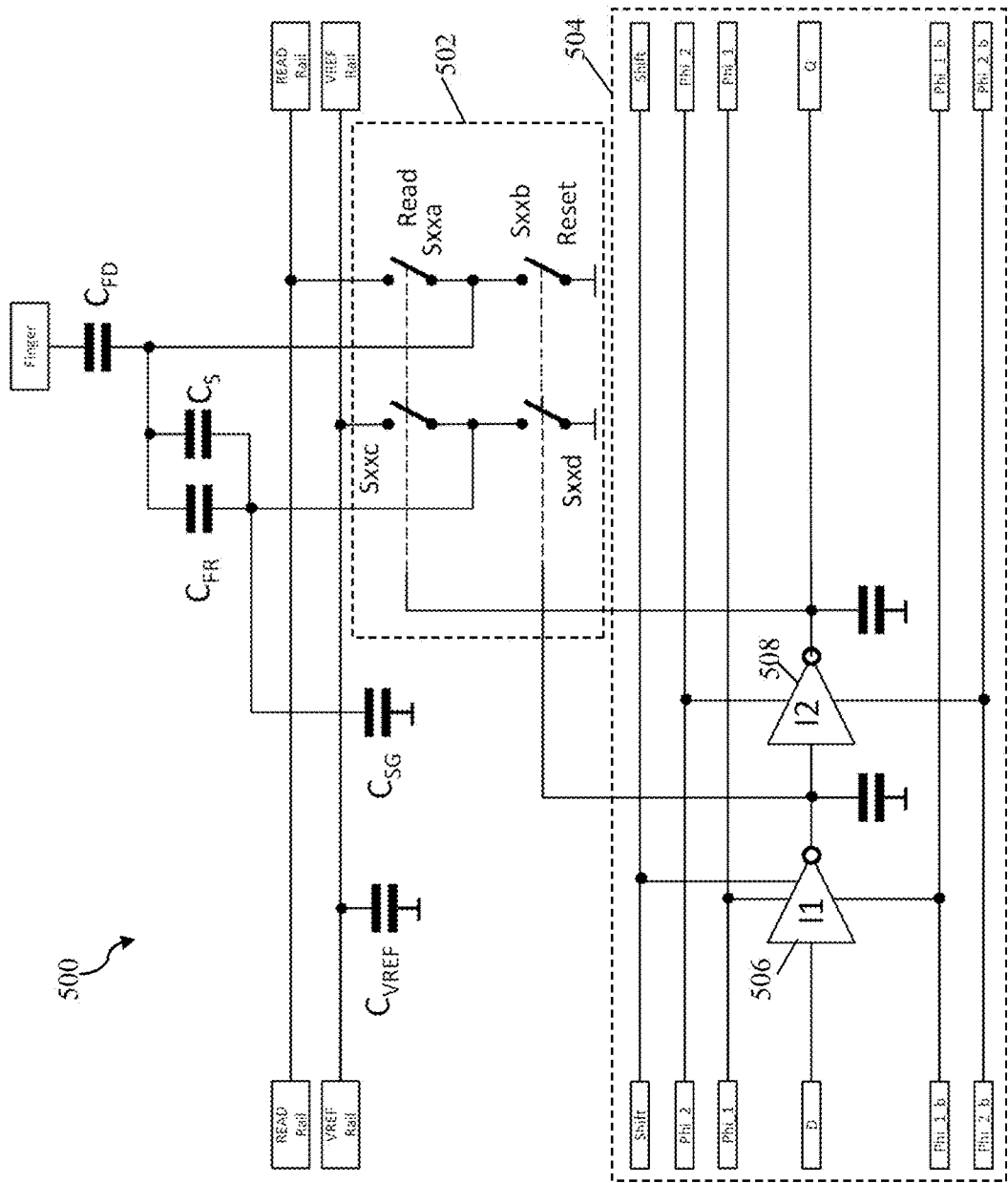
FIG. 5 shows a further illustrative embodiment of a fingerprint sensing system.
Figure 6:
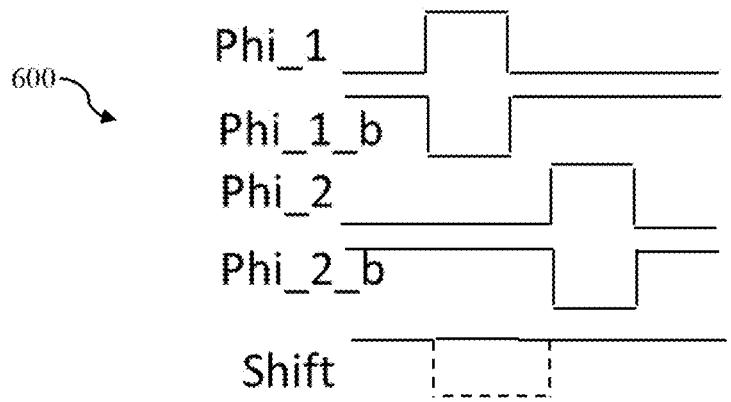
FIG. 6 shows an example of a four-phase clock.

FIG. 5 shows a further illustrative embodiment of a fingerprint sensing system 500. As mentioned above, in one or more embodiments, the system further comprises a shift register arrangement configured to control a plurality of switches for facilitating selectively activating said at least one of the plurality of sensors. In this example, the plurality of switches 502 is controlled by the shift register arrangement 504. This approach may provide flexibility in addressing individual sections of one row and may remove the requirement for complex processing options when integrating the sensing system 500 as a monolithically integrated device. The shift register comprising the clocked inverters 506 and 508 may be controlled by a four-phase clock as shown in FIG. 6. The sensor cell shown in FIG. 5 may comprise all circuitry including the shift register, the sensor plate, the shield plate, the switches 502 required to operate the sensor plate and the shield plate, and a storage capacitor $C_{VREF}$. The function of the storage capacitor has already been described above. It may be advantageous to distribute this capacitor over the entire sensor area. Furthermore, it may be advantageous to choose small dimensions for the switches 502 in order to minimize the impact of junction capacitances connected to the readout rail.

The shift register may be configured in such a way that a single logic high-pulse may be shifted under control of proper clock signals through the shift register. Such clock signals may be applied according to FIG. 6. The Shift signal may be kept at a logic High level to enable a shift operation. When the Shift signal is set to Low, data transfer from inverter 506 to inverter 508 may be blocked and the Q-output of the shift register cell may be set to Low (=shift-pulse is cleared). Thus a shift pulse may be deleted under control of the Shift signal. The Reset switches $S_{xxb}$ and $S_{xxd}$ may be controlled by inverter 506. In case of a logic High at the D-input the reset operation of the sensor capacitor and the shield capacitor may be stopped with Phi_1-phase. With Phi_2-phase $S_{xxa}$ and $S_{xxc}$ may be activated and the sensor capacitor may be connected to the Read_Rail and the shield capacitor may be connected to the $V_{REF}$ Rail. The control of the switches $S_{xxa}$-$S_{xxd}$ may implement a break-before-make characteristic that may be required for proper readout. Parasitic capacitances at the outputs of the inverters 506 and 508 may be used to store intermediate levels while clocks are inactive.

A fingerprint sensing system of the kind set forth may be built by placing pixel sensor cells (i.e., individual sensors) in a matrix configuration. The operation of the shift registers may utilize a dedicated controller that may be configured to translate row and column positions into shift register control and pre-set information. Operation of the row readout may be achieved by configuring the row control to translate row and column positions into timing and control information for the row control and readout. The shift register of one row may be pre-set to a dedicated start position by shifting a logic high pulse up to the required start position while the related Read_Rail is not connected to the readout amplifier (=inactive). Such pre-set operation may be executed while another row is still connected to the readout amplifier (=active) for reading sensor plate capacitances.

Figure 7:
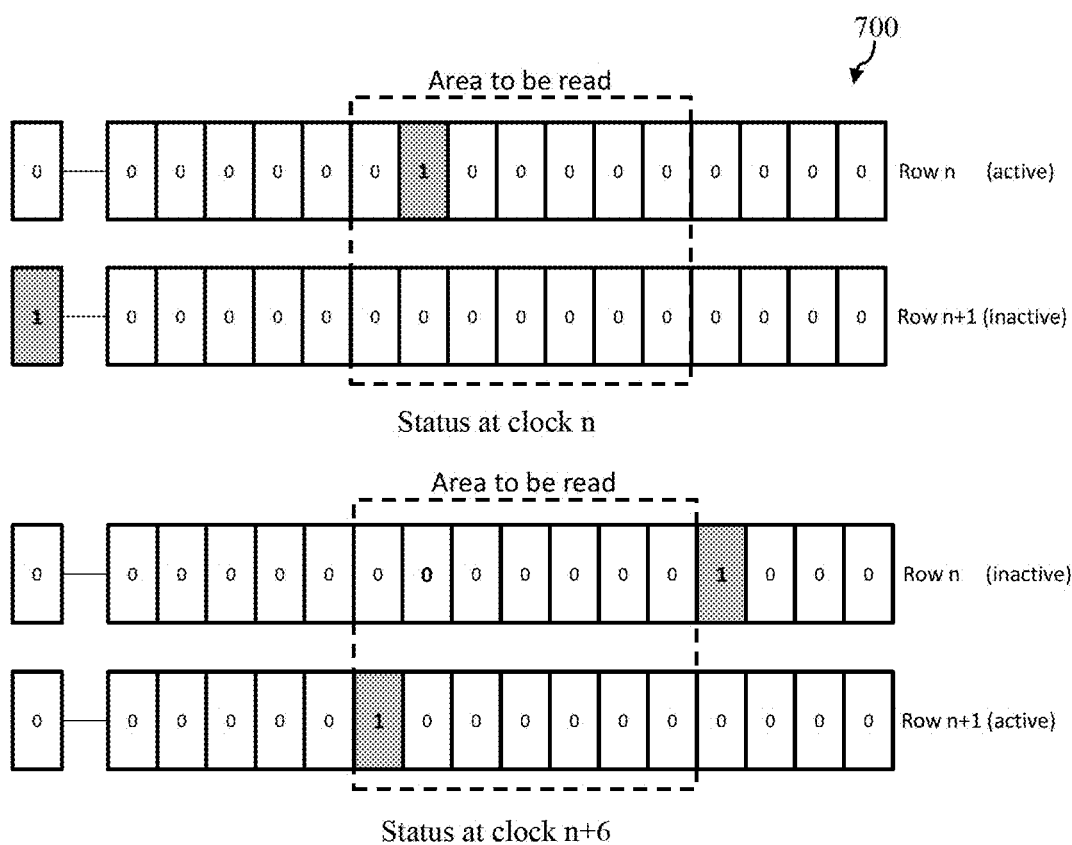
FIG. 7 shows an example of shift register operations.

FIG. 7 shows an example of shift register operations 700. The status at "clock n" indicates row n in active state and row n+1 in inactive state. In order to continue reading with row n+1 as active row after 6 clock cycles at the right start position of the desired area the shift-register of row n+1 hast to be pre-set in this example 6 clock cycles before the shift pulse in row n has left the desired area window. At status "clock n+6" row n+1 is now in active state and the shift pulse is at the beginning of the read area while row n is turned into inactive state and its shift pulse may be cleared utilizing the shift control signal.

Figure 8:
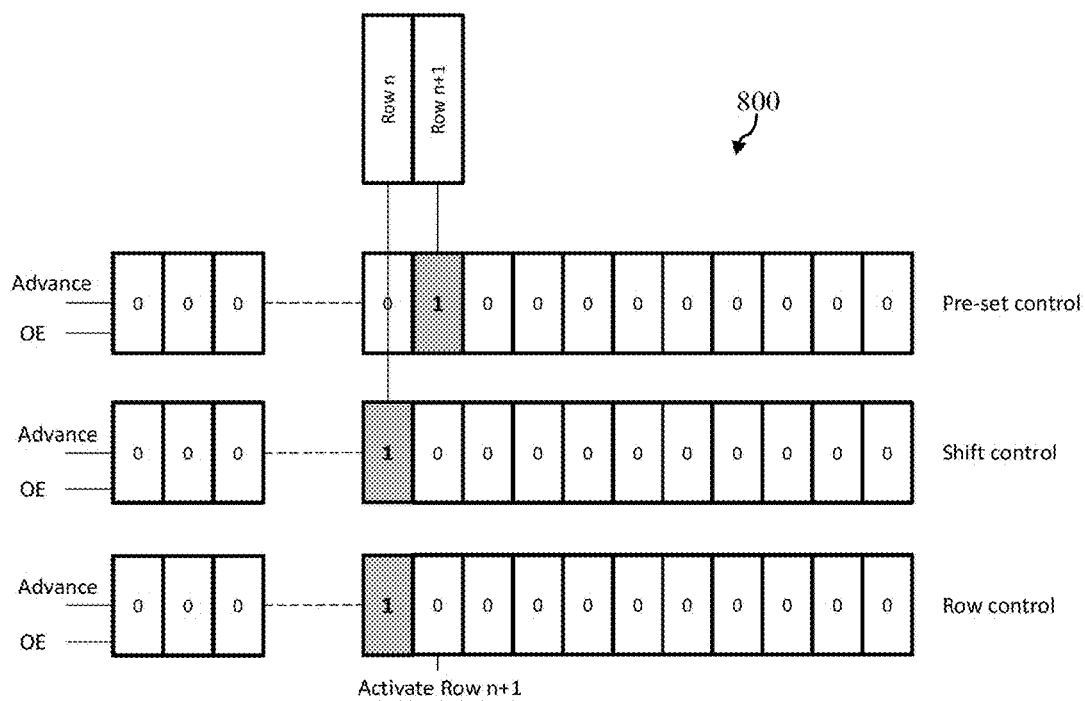
FIG. 8 shows another example of shift register operations.

FIG. 8 shows another example of shift register operations 800. Due to the fact that an image area may always be scanned in a similar manner (left to right, top to bottom) the pre-set, shift and row control signals may also be provided by shift-registers as shown in FIG. 8. Three shift-registers may provide pre-set pulse, shift clear pulse and row activation signal. These signals are controlled by an Advance signal that shifts the high pulse one row position further and an Output Enable (OE) pulse that gates the shift-register output. The required Advance, Output Enable and clock signals may be provided by a configurable state-machine as part of a shift register and row control block. In some embodiments a fourth shift-register may be used to provide a clock enable signal to dedicated rows. A two-pulse pattern may be shifted through this register, enabling the activation of two shift-registers—one shift-register for the active row and one shift-register for the pre-set row. This implementation may enable power saving by switching off unwanted rows. Such a flexible pre-set mechanism may be used to capture a dedicated area of a fingerprint that may contain relevant fingerprint information.

Figure 9:
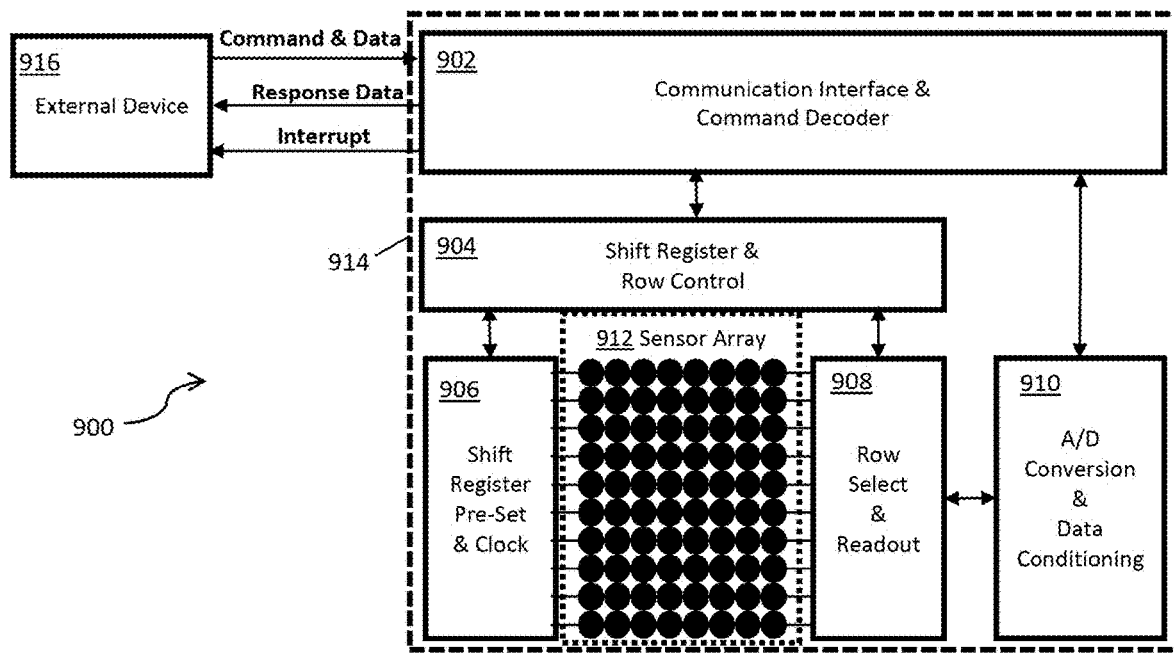
FIG. 9 shows an illustrative embodiment of a fingerprint sensing system implementation.

FIG. 9 shows an illustrative embodiment of a fingerprint sensing system implementation 900. In particular, it shows an example of an implementation of a fingerprint sensing system 914, which may comprise a communication interface and command decoder block 902, a shift register and row control block 904, a shift register pre-set and clock block 906, a row select and readout block 908, and an analog-to-digital (A/D) conversion and data conditioning block 910. The communication interface 902 may be configured to receive configuration commands and configuration data from an external device 916. An embedded command decoder may be configured to control the shift register and row control unit 904 in response to the commands and associated data received from the external device 916. Read access to individual sensor cells is controlled by the outputs of shift-registers, wherein one shift-register may control access to sensor cells being arranged in one row. Multiple of said shift-registers may enable accessing sensor cells in multiple rows. The shift register and row control unit 904 may be a state machine that in conjunction with said shift-registers may be configured to sequentially select and read individual sensor pixels of the sensor array 912. A row-select and readout unit 908 under control of the shift-register and row control unit 904 may connect an individual sensor cell to a central readout unit which may perform a capacitance-to-voltage conversion. An analog-to digital (A/D) conversion and data conditioning unit 910 may be configured to convert a voltage level provided by the readout unit 908 into its numerical representation. Said numerical representation may be communicated by the communication interface unit 902 to the external device 916.

In some embodiments, the number of sensors in one row of the sensor array 912 may be 80, the number of rows may be 96 and the sensor area may be configured to provide a pixel resolution of 250 dpi. It may be advantageous to apply such non-quadratic matrix implementation that better fits the rectangular nature of a real fingerprint image if rotation of the fingerprint with respect to the sensor device may be restricted to, for example, about 20 degrees. Data conditioning may comprise suitable analog-to-digital conversion and storage of the digital representations in an intermediate storage unit. In some embodiments, a pipelined analog-to-digital converter with pre-settable bit resolution is utilized that may be configured for 1-bit resolution as well as for other bit resolutions.

Figure 10:
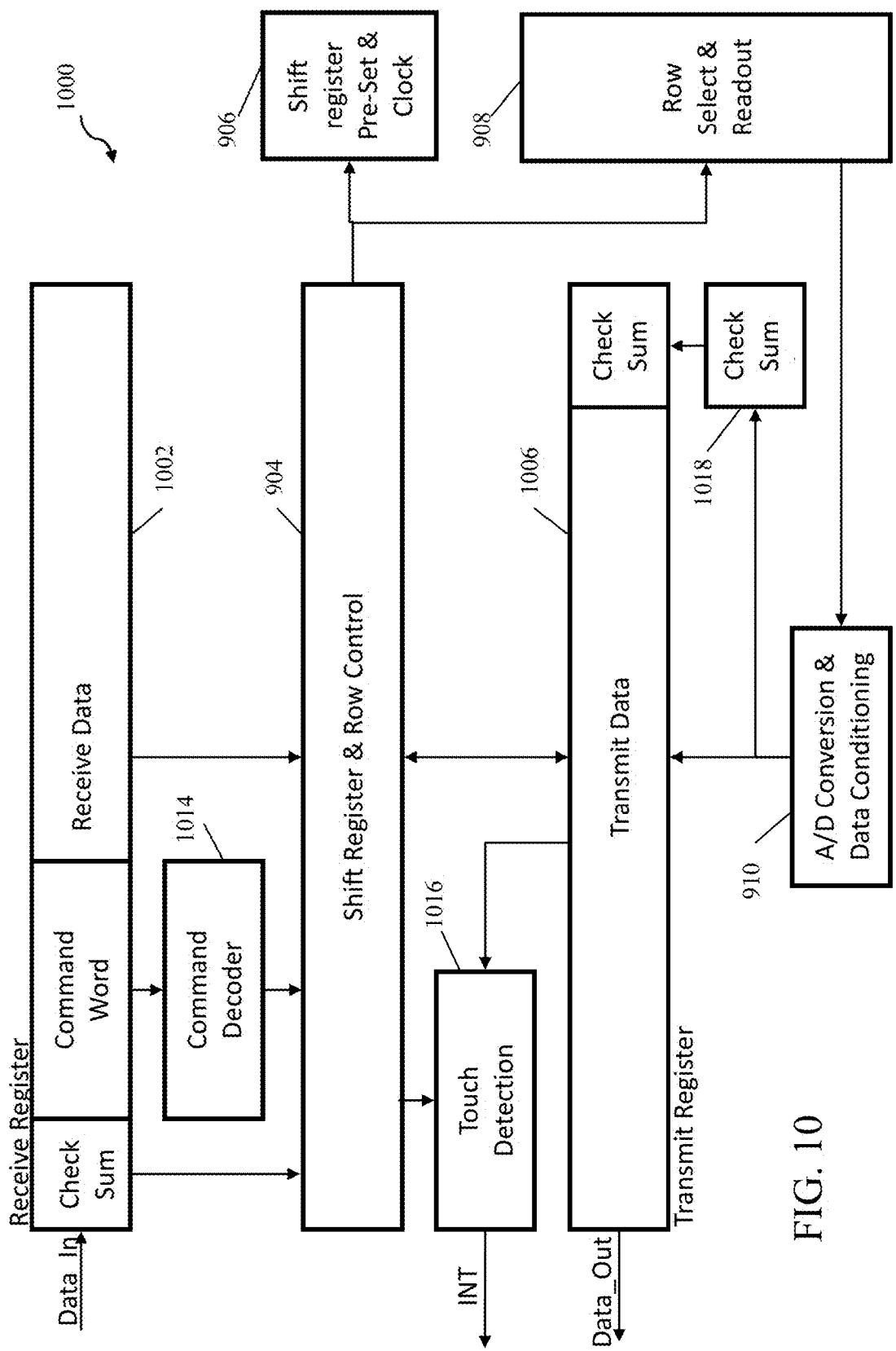
FIG. 10 shows an illustrative embodiment of a communication interface.

FIG. 10 shows an illustrative embodiment of a communication interface 1000. The communication interface 1000 comprises a receive register 1002 operatively coupled to a command decoder 1014, a transmit register 1006, a checksum generator 1018 and a touch detection block 1016. The receive register 1002 is operatively coupled to the shift register and row control block 904. Furthermore, the transmit register 1006 is operatively coupled to the shift register and row control block 904 and to the touch detection block 1016. The shift register and row control block 904 is operatively coupled to the shift register pre-set and clock block 906 and to the row select and readout block 908. Furthermore, the analog-to-digital conversion and data conditioning block 910 is operatively coupled to the transmit register 1006 and to the row select and readout block 908. Furthermore, the checksum generator 1018 is operatively coupled between the analog-to-digital conversion and data conditioning block 910 and the transmit register 1006.

In some embodiments, a Serial Peripheral Interface (SPI) may be implemented and used for communication between the external device 916 and the fingerprint sensing system 914. The external device 916 may issue configuration command words, configuration data and a checksum to the fingerprint sensing system 914, which may be configured to decode said configuration commands, and may furthermore be controlled to execute reading a dedicated subset of the total area occupied by the sensors. Said subset may also represent the full image sensing area. The fingerprint sensing system 914 may return image data from the intermediate storage unit and a check-sum to the external device 916 embedded in a transmit data structure that may be processed by the external device 916.

Figure 11:
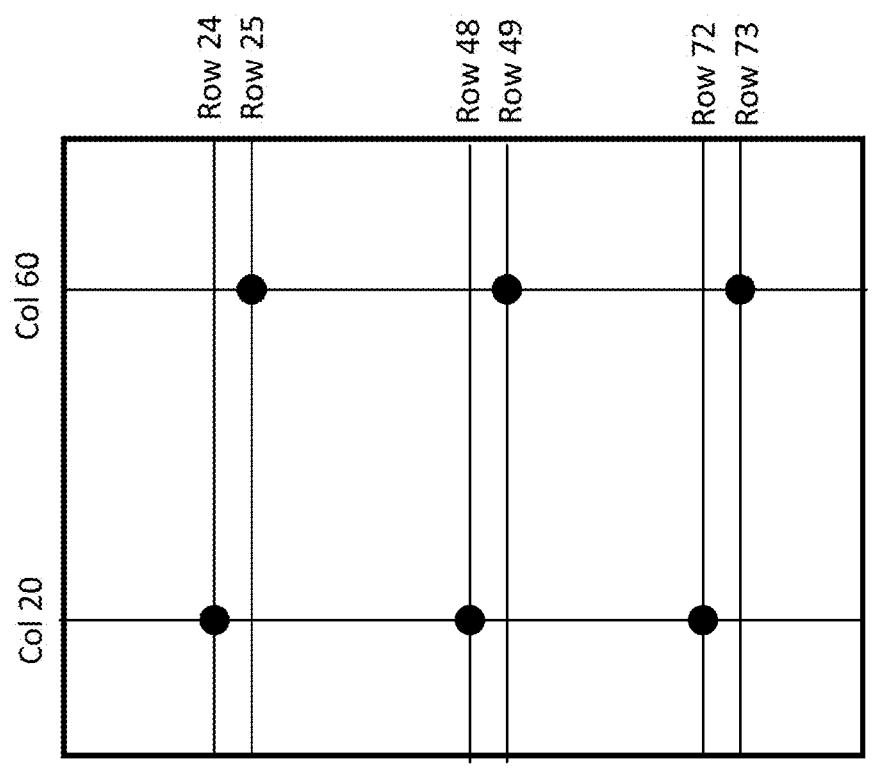
FIG. 11 shows an example of a predefined subset of sensors.

FIG. 11 shows an example of a predefined subset of sensors. In one or more embodiments, the controller is further configured to periodically evaluate a predefined subset of the plurality of sensors. In particular, predefined pixel positions of the total sensor area may be evaluated periodically in order to detect a change in measured capacitances. A single row offset between horizontally adjacent pixels may simplify the shift-register control without degradation of the detection quality. Such change detection may be indicative for a detected finger touch and may further be utilized to provide an interrupt request signal to the external device. The interrupt request signal may be utilized to start a new fingerprint image scan, for example. This mechanism may also be used to reduce the power consumption in case no finger is in contact with the sensing system, e.g. by merely scanning the predefined pixel positions. Optionally, configuration commands may comprise test commands that may cause the fingerprint sensing system to execute self-tests and to return the self-test results to the external device. Furthermore, a configuration command may request the average signal level of the system that may e.g. be used to control the readout amplifier's gain. Furthermore, the sensing system may be configured to receive gain setting commands for dedicated pixels.

Figure 12:
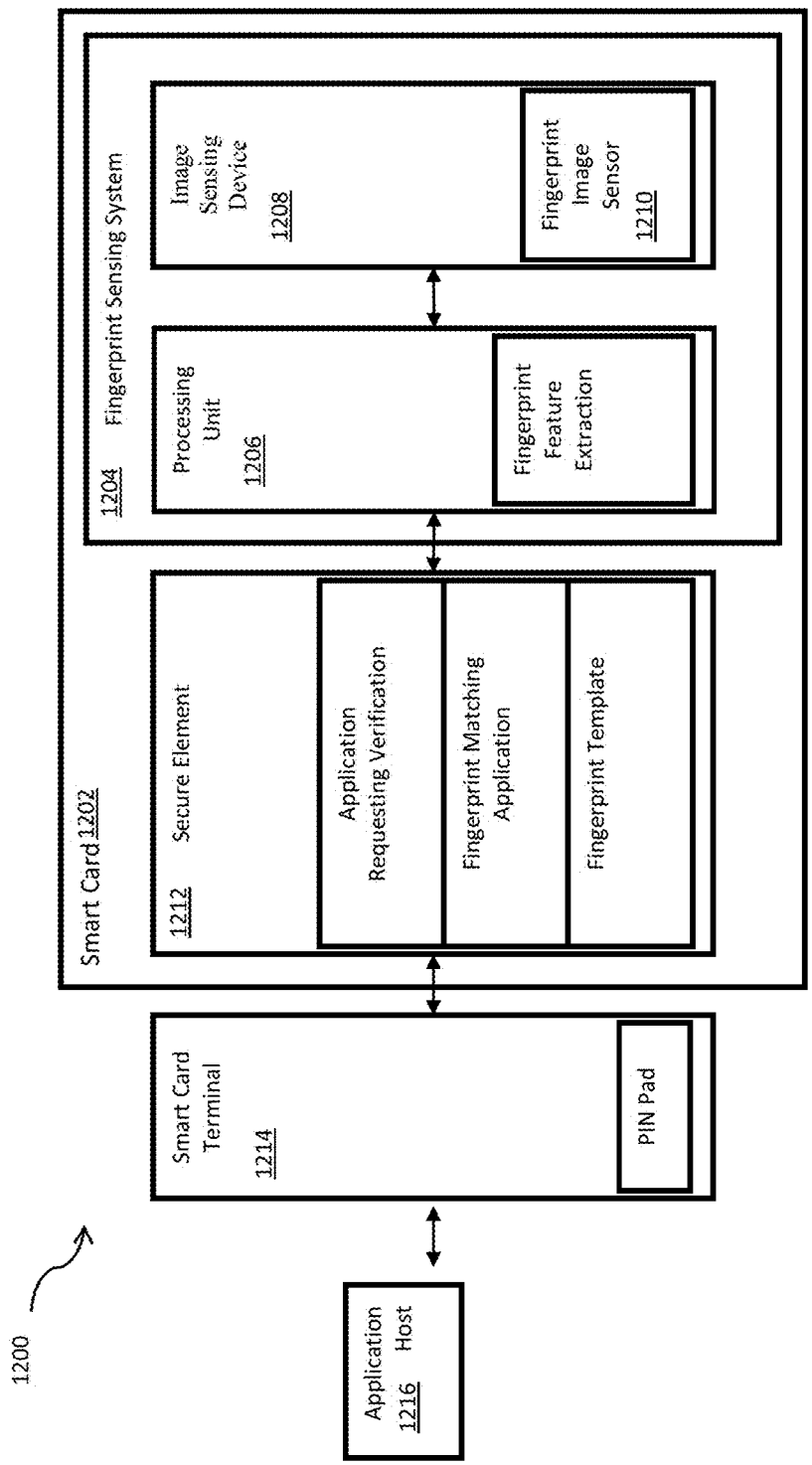
FIG. 12 shows an illustrative embodiment of a transaction execution system.

FIG. 12 shows an illustrative embodiment of a user authentication system 1200. The user authentication system 1200 comprises a smart card 1202, a smart card terminal 1214 and an application host 1216. In operation, the smart card 1202 may be presented to the smart card terminal 1214 in order to initiate a transaction and to authenticate the user to an application host 1216. The application host 1216, e.g. a cloud server, may be configured to perform the transaction. The smart card 1202 comprises a fingerprint sensor block 1204, which in turn comprises a fingerprint sensing system 1208 of the kind set forth and a processing unit 1206 (corresponding to the external device 916 shown in FIG. 9). Furthermore, the smart card 1202 comprises a secure element 1212. In operation, the processing unit 1206 may extract fingerprint features from capacitive measurements performed by the fingerprint sensing system 1208 on the fingerprint image sensor 1210 (i.e., the sensor array). The extracted fingerprint features may be transmitted to the secure element 1212 for verification. Alternatively, the processing unit 1206 may perform said verification without involving the secure element 1212.

In particular, the processing unit 1206 may be configured to receive fingerprint image data from the fingerprint sensing system 1208. Furthermore, the processing unit 1206 may execute fingerprint feature extraction application software which extracts and provides verification-relevant feature data to the secure element 1212. The secure element 1212, in turn, may execute fingerprint matching application software to match the verification-relevant feature data provided by the processing unit 1206 with a reference fingerprint template securely stored in the secure element 1212. The secure element 1212 may also be configured to provide the matching result, which may represent one of the states "matching achieved" or "matching not achieved", to an application executed by the secure element 1212 and requesting verification. Such an application may for example be a payment applet or an identity card applet. The application requesting verification may be configured to respond to a request from the smart card terminal 1214 to provide the matching result. Furthermore, the application may utilize a PIN-entry through a PIN-pad connected to or comprised in the card terminal 1214 in case fingerprint verification has failed a predefined number of attempts. Optionally, the matching result is forwarded in encrypted format to the application requesting verification. Furthermore, the processing unit 1206 may be substituted by an application processor of a mobile device. Furthermore, the secure element 1212 and the processing unit 1206 may be monolithically integrated and may be combined in a system-in-package module with the fingerprint sensing system 1208.

It is clear from the above example that the presently disclosed fingerprint sensing system may be used to advantage in smart cards. For example, it may be well suited for low-cost contactless banking and identification cards. However, it is noted that the presently disclosed sensing system is not limited to smart cards, and that it may be used to advantage in other devices as well. For example, the presently disclosed fingerprint sensing system may be used in mobile devices, such as smart phones and tablets. Furthermore, the presently disclosed fingerprint sensing system may be used in vehicles, for example in the field of fingerprint-enabled car access and car demobilization.

The systems and methods described herein may at least partly be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 fingerprint sensing system
102 sensor array
104 controller
106 active sensor
108 active sensor
200 fingerprint sensing system
202 active sensor
204 coating
206 passivation layer
208 substrate
210 finger
212 N-diffusion
214 first conductive layer (sensor plates)
216 second conductive layer (shields)
218 conductive ring
300 fingerprint sensing system
302 readout amplifier
304 operational transconductance amplifier
306 operational transconductance amplifier
308 reference voltage source
310 finger
314 first conductive layer (sensor plates)
316 second conductive layer (shield plates)
318 output
400 capacitor controller
402 decoder
404 switch
406 switch
408 switch
500 fingerprint sensing system 502 switches
504 shift register arrangement
506 clocked inverter
508 clocked inverter
600 four-phase clock
700 shift register operations
800 shift register operations
900 fingerprint processing system
902 communication interface and command decoder
904 shift register and row control
906 shift register pre-set and clock
908 row select and readout
910 analog-to-digital conversion and data conditioning
912 sensor array
914 fingerprint sensing system
916 external device
1000 communication interface
1002 receive register
1006 transmit register
1014 command decoder
1016 touch detection
1018 checksum generator
1100 predefined subset of sensors
1200 user authentication system
1202 smart card
1204 fingerprint sensing system
1206 processing unit
1208 image sensing device
1210 fingerprint image sensor
1212 secure element
1214 smart card terminal
1216 application host

The invention claimed is:

1. A fingerprint sensing system, comprising:
a plurality of sensors and a controller, wherein the controller is configured to selectively activate at least one of the plurality of sensors;
wherein the controller is further configured to develop and measure at least one first capacitance, the first capacitance developing in response to a capacitance between a surface of an active sensor and a surface of a finger;
wherein the controller is further configured to develop at least one second capacitance, the second capacitance developing in response to a capacitance between a surface of an inactive sensor and the surface of the finger, and
wherein the plurality of sensors are formed in a first conductive layer of an integrated circuit, and a second conductive layer is selectively connectable to ground potential or to a reference potential via one or more switches and arranged to reduce a parasitic capacitance that develops between the plurality of sensors and a substrate of the integrated circuit.

2. The fingerprint sensing system of claim 1, wherein the controller is a readout amplifier.

3. The fingerprint sensing system of claim 1, wherein the sensors correspond to pixels of a fingerprint image.

4. The fingerprint sensing system of claim 1, wherein at least one sensor is surrounded by a conductive ring electrically coupled to the second conductive layer.

5. The fingerprint sensing system of claim 1, wherein the second conductive layer is coupled to the first conductive layer via a voltage follower.

6. The fingerprint sensing system of claim 1, wherein the reference potential is provided by a voltage follower operatively coupled to a storage capacitor.

7. The fingerprint sensing system of claim 6, wherein the storage capacitor is configured as an N-diffusion on P-substrate gate-oxide capacitor or an N-diffusion on N-well gate-oxide capacitor.

8. The fingerprint sensing system of claim 1, further comprising a shift register arrangement configured to control a plurality of switches for facilitating selectively activating said at least one of the plurality of sensors.

9. The fingerprint sensing system of claim 1, wherein the controller is further configured to periodically evaluate a predefined subset of the plurality of sensors.

10. A smart card comprising the fingerprint sensing system of claim 1.

11. A fingerprint sensing method, comprising:
selectively activating, by a controller in a fingerprint sensing system, at least one of a plurality of sensors of said fingerprint sensing system;
developing and measuring, by said controller, at least one first capacitance, the first capacitance developing in response to a capacitance between a surface of an active sensor and a surface of a finger;
developing, by said controller, at least one second capacitance, the second capacitance developing in response to a capacitance between a surface of an inactive sensor and the surface of the finger, and
wherein the plurality of sensors are formed in a first conductive layer of an integrated circuit, and a second conductive layer is selectively connectable to ground potential or to a reference potential via one or more switches and arranged to reduce a parasitic capacitance that develops between the plurality of sensors and a substrate of the integrated circuit.

* * * * *